(12) United States Patent
Burtscher

(10) Patent No.: US 10,144,070 B2
(45) Date of Patent: Dec. 4, 2018

(54) DOUBLE-SIDED CUTTING INSERT AND MILLING TOOL

(71) Applicant: CERATIZIT AUSTRIA GESELLSCHAFT M.B.H., Reutte (AT)

(72) Inventor: Peter Burtscher, Haeselgehr (AT)

(73) Assignee: CERATIZIT Austria Gesellschaft m.b.H., Reutte (AT)

( * ) Notice: Subject to any disclaimer, the term of this patent is extended or adjusted under 35 U.S.C. 154(b) by 66 days.

(21) Appl. No.: 15/508,597

(22) PCT Filed: Aug. 11, 2015

(86) PCT No.: PCT/AT2015/000107
§ 371 (c)(1),
(2) Date: Mar. 3, 2017

(87) PCT Pub. No.: WO2016/033620
PCT Pub. Date: Mar. 10, 2016

(65) Prior Publication Data
US 2017/0282262 A1 Oct. 5, 2017

(30) Foreign Application Priority Data

Sep. 3, 2014 (AT) .......................... GM 311/2014 U

(51) Int. Cl.
*B23C 5/20* (2006.01)
*B23C 5/06* (2006.01)
(Continued)

(52) U.S. Cl.
CPC ............... *B23C 5/207* (2013.01); *B23C 5/06* (2013.01); *B23C 5/2221* (2013.01); *B23C 5/109* (2013.01);
(Continued)

(58) Field of Classification Search
CPC . B23C 5/202; B23C 5/207; B23C 2200/0455; B23C 2200/203;
(Continued)

(56) References Cited

U.S. PATENT DOCUMENTS

| 4,044,439 | A |   | 8/1977 | Romagnolo |
| 5,382,118 | A | * | 1/1995 | Satran ....................... B23C 5/06 |
|           |   |   |        | 407/113 |

(Continued)

FOREIGN PATENT DOCUMENTS

| DE | 8915088 U1 | 4/1990 |
| EP | 2198997 A2 | 6/2010 |

(Continued)

*Primary Examiner* — Will Fridie, Jr.
(74) *Attorney, Agent, or Firm* — Laurence A. Greenberg; Werner H. Stemer; Ralph E. Locher

(57) ABSTRACT

A reversible cutting insert for milling has first and second cutting edges formed at the transitions from the top and bottom surfaces to a lateral face. The cutting insert has a 4-fold rotational symmetry. A reference plane extends perpendicular to the axis of symmetry. The cutting edges have four cutting edge portions. One cutting edge portion is a main edge and a wiper edge that are connected by a rounded cutting corner. The first and second cutting edges are at the greatest distance from the reference plane in the region of the cutting corners. Main and wiper clearance faces directly adjoin an assigned main edge and wiper edge, respectively, in the circumferential lateral face. Exterior angles between the main clearance faces and the reference plane are greater than exterior angles between the wiper clearance faces and the reference plane.

13 Claims, 8 Drawing Sheets

(51) Int. Cl.
  *B23C 5/22* (2006.01)
  *B23C 5/10* (2006.01)
(52) U.S. Cl.
  CPC .......... *B23C 2200/0455* (2013.01); *B23C 2200/0461* (2013.01); *B23C 2200/125* (2013.01); *B23C 2200/208* (2013.01); *B23C 2200/286* (2013.01); *B23C 2220/16* (2013.01)
(58) Field of Classification Search
  CPC .......... B23C 2200/208; B23C 2200/12; B23C 2200/125; B23C 2200/28
  See application file for complete search history.

(56) References Cited

U.S. PATENT DOCUMENTS

| | | | | |
|---|---|---|---|---|
| 5,421,679 A | * | 6/1995 | Pantzar | B23C 5/202 407/113 |
| 5,718,540 A | * | 2/1998 | Satran | B23C 5/2221 407/113 |
| 8,491,234 B2 | * | 7/2013 | Fang | B23C 5/109 407/113 |
| 9,278,396 B2 | * | 3/2016 | Diepold | B23C 5/202 |
| 2007/0041797 A1 | | 2/2007 | Jang et al. | |
| 2007/0224006 A1 | | 9/2007 | Smilovici et al. | |
| 2010/0202839 A1 | * | 8/2010 | Fang | B23C 5/109 407/53 |
| 2010/0239379 A1 | | 9/2010 | Choi et al. | |
| 2012/0275868 A1 | | 11/2012 | Saito et al. | |
| 2014/0199127 A1 | | 7/2014 | Imai et al. | |
| 2016/0214186 A1 | * | 7/2016 | Mura | B23C 5/109 |
| 2016/0271707 A1 | * | 9/2016 | Lee | B23C 5/207 |
| 2017/0008099 A1 | * | 1/2017 | Touma | B23C 5/109 |

FOREIGN PATENT DOCUMENTS

| | | |
|---|---|---|
| JP | H07237025 A | 9/1995 |
| JP | H10277815 A | 10/1998 |
| JP | 2008544872 A | 12/2008 |
| JP | 2013006221 A | 1/2013 |
| JP | 2014136264 A | 7/2014 |
| RU | 85383 U1 | 8/2009 |
| SU | 676148 A3 | 7/1979 |
| WO | 2013029072 A1 | 8/2012 |
| WO | 2013119036 A1 | 8/2013 |

* cited by examiner

B-B

C-C

DOUBLE-SIDED CUTTING INSERT AND MILLING TOOL

BACKGROUND OF THE INVENTION

Field of the Invention

The present invention relates to a reversible cutting insert for milling tools, in particular for a corner milling cutter, and to a milling tool.

Milling tools, where one or more exchangeable cutting inserts are arranged in a radial or tangential alignment on a support body of the milling tool, are known for the machining of, in particular, metal workpieces. The support body is normally constructed from a tough material such as tool steel, whilst the cutting inserts are produced from a hard and wear-resistant material, typically from hard metal, cermet or ceramic materials, and are consumable articles which have to be replaced at more or less regular intervals due to wear. For economic reasons, cutting inserts are frequently realized as so-called indexable cutting inserts which comprise a plurality of identically realized cutting edges. By changing the relative alignment between the cutting insert and the support body of the milling tool, said cutting edges can one after another be moved into an active position in which they carry out a machining process. The respectively inactive cutting edges, in this case, do not engage the workpiece to be machined and can be moved subsequently into the active machining position, e.g. once the previously active cutting edges are worn. For efficient utilization of the cutting insert, efforts are made to have as large a number as possible of cutting edges that can be used one after another on one cutting insert.

Along with one-sided cutting inserts, where the successively used cutting edges are arranged on only one working face of the predominantly plate-shaped cutting inserts, increasingly used are reversible cutting inserts, where the cutting edges are located on two oppositely situated working faces of the cutting insert. Double-sided cutting inserts have the advantage over one-sided cutting inserts of the cutting insert, once the cutting edges on one side have worn, being able to be reversed such that the number of cutting edges available overall is doubled compared to single-sided cutting inserts. With double-sided cutting inserts, however, with an increasing number of cutting edges on one cutting insert, it becomes more difficult to protect the inactive cutting edges from wear or damage during the machining operation and to realize the necessary clearance angles of the cutting edges in each indexing position when the milling tool is rotating.

Milling tools are known which comprise both main cutting edges or main edges which cut on the periphery and secondary or wiper cutting edges which are arranged on the end face of the milling cutter. With the cutting insert installed in a milling tool, the wiper cutting edge or wiper edge is usually arranged substantially perpendicular to a rotational axis of the milling tool and smoothes the surface. However, the wiper cutting edge does not usually run exactly perpendicular to the rotational axis, but is slightly tilted in the direction of the rotational axis, e.g. by up to 1°. In the case of corner milling cutters for milling 90° degree corners or shoulders, the main cutting edge and the associated wiper cutting edge, which is connected thereto by means of a cutting corner, are arranged in such a manner that they generate a corner at an angle of at least substantially 90° during machining, the transition radius being determined by the radius of curvature of the cutting corner.

In order, during operation, to avoid wearing the passive cutting edge which is rearward with reference to the rotation, it is known to arrange the cutting insert in a tilted manner in the milling tool, both tilted forward in the axial direction in order to protect the cutting edge that is located behind the wiper cutting edge which engages in the workpiece, and tilted in the radial direction in order to protect the cutting edge which is located behind the main cutting edge which engages in the workpiece.

It must be noted that in the present technical area certain terms such as, for example, clearance angle, rake angle, etc. can be defined, on the one hand, "nominally" with reference to the cutting insert and, on the other hand, (differently) also "effectively" with reference to the assembly situation of the cutting insert on a milling tool relative to the workpiece. In the following description, said terms are mainly used "nominally" without in each case a corresponding addition being expressly mentioned. The resulting "effective" angles are determined by the "nominal" angles in combination with the radial and axial orientation of the cutting insert in the support body of the milling tool.

It must additionally be noted that the terms "top surface" and "bottom surface" serve exclusively for the purposes of simpler description and are not to be understood as restricting. Depending on the fastening orientation in the milling tool, the bottom surface of the cutting insert can consequently be situated above the top surface and vice versa, the top surface can be below the bottom surface.

SUMMARY OF THE INVENTION

The object of the present invention is to provide an improved cutting insert to be used in a milling tool, in particular in a corner milling cutter, and an improved milling tool by means of which shoulders with substantially 90° corners can be milled in a reliable and efficient manner in the workpiece to be machined and in operation a high quality machined workpiece surface can be achieved.

The reversible cutting insert comprises a plate-shaped basic body with a top surface and a bottom surface, the basic body having a substantially square-shaped basic form in a top view onto the top surface, and the top surface and the bottom surface being connected by a circumferential lateral face. A first cutting edge, which extends at least in portions along the periphery of the basic body, is realized at a transition from the top surface to the circumferential lateral face; a second cutting edge, which extends at least in portions along the periphery of the basic body, is also realized at a transition from the bottom surface to the circumferential lateral face. The cutting insert comprises a 4-fold rotational symmetry with reference to an axis of symmetry. A reference plane, which divides the cutting insert into two virtual halves, runs perpendicular to the axis of symmetry. The first and second cutting edges comprise in each case four cutting edge portions, which can be indexed, i.e. one after another be moved into the active position. A cutting edge portion, in this case, comprises in each case a main edge and a wiper edge which are connected together by means of an associated rounded cutting corner. The first and second cutting edges consequently comprise alternatingly arranged main edges and wiper edges, the alternating arrangement being interrupted at the corners by cutting corners. In each case, a main edge and a wiper edge, which is connected to the main edge by means of a cutting corner, are situated in an active position, whilst the remaining main edges and wiper edges are inactive in said indexing. The main edge, in each case, has associated therewith a, preferred planar, main clearance face which is realized directly adjoining the main edge in the circumferential lateral face. The wiper edge, in each case, has associated therewith a, preferred planar, wiper clearance face which is realized directly adjoining the wiper edge in the circumferential lateral face. According to the invention, the first and second cutting edges are, in each case in the region of the cutting corners, at the greatest distance from the imaginary reference plane which divides the cutting insert into two halves. The distance between each main edge and the reference plane is consequently (apart from, where applicable, in the region directly adjoining the cutting corner) always smaller than the largest distance between the cutting corners and the reference plane over the entire development of the main edge. In an analogous manner, the distance between each wiper edge and the reference plane is always smaller than the greatest distance between the cutting corners and the reference plane over the entire development of the wiper edge. The cutting insert according to the invention is further characterized in that an exterior angle realized between the main clearance face and the reference plane differs from the exterior angle realized between the wiper clearance face and the reference plane, the exterior angle between the main clearance face and the reference plane being greater than the exterior angle between the wiper clearance face and the reference plane. The respective exterior angles can vary along the development of the main or wiper edges. At positions of the main and wiper edges which correspond with one another and are at the same distance from the respectively associated cutting corner, the exterior angle in the region of the main edge is always selected to be larger than the exterior angle of the wiper edge.

As a result of the realization according to the invention of the cutting insert, it is possible to mill in particular 90° corners with good surface quality from the workpiece to be machined. In a preferred manner, the cutting insert according to the invention is realized in the basic form of a so-called S-plate (square, square-shaped). The cutting insert is reversible and per cutting edge has four cutting edge portions which can be used independently of one another. There are therefore present a total of eight individually usable main edges and eight associated wiper edges, thereby ensuring efficient utilization of the cutting insert.

The eight cutting corners located between respective main and wiper edges are arranged in an elevated manner with reference to the reference plane.

Proceeding from an active cutting corner, which is situated in operation between an active main edge which engages in the material to be machined and an active wiper edge which engages in the material to be machined, the respective main edges extend up to the adjacent inactive wiper edge preferably in a monotonously declining manner, i.e. proceeding from a cutting corner, the main edge moves closer to the reference plane over its entire development or runs at most in regions parallel to the same. The achievement here is that even with the cutting insert in the corresponding tilted, axially negative assembly position in the milling tool, the main edge comprises a positive effective axial angle over the entire length and the entire length of the main edge can be utilized for a soft and effective machining process. At the same time, the cutting edge which is located in the direction of rotation behind the wiper edge which engages in the workpiece is protected as a result of the axially negatively tilted assembly position of the cutting insert.

In a preferred embodiment, the main edges merge into alignment with the adjacent wiper edges which are associated with another cutting edge portion. The respective wiper edges consequently extend from an adjacent main edge, which is associated with another cutting edge portion, up to the associated cutting corner preferably in a monotonously declining manner. Proceeding from an adjacent main edge, the wiper edge moves closer to the reference plane in the direction of the cutting corner over its entire development or runs at most in regions parallel to the same. The region of the main edge connecting to the cutting corner is at a greater distance from the reference plane than the region of the wiper edge connecting to the cutting corner. The cutting corner, consequently, declines more in the direction of the wiper edge than in the direction of the main edge insofar as the cutting corner declines at all in the direction of the wiper edge. The cutting insert is fastened on the carrier body of the milling tool in a radially negatively tilted assembly position, as a result of which the passive cutting edge which is located behind the active main edge in the direction of rotation is protected from wear. The different inclination of the clearance faces in the region of the main edge and in the region of the wiper edge, i.e. of the main clearance face and of the wiper clearance face, enables the required independent tilting in the axial and radial directions.

In a preferred embodiment, the first or second cutting edges are realized as a complete edge, i.e. the main and wiper edges are arranged in an alternating manner, interrupted by cutting corners, and adjacent main and wiper edges, which are not associated with the same cutting edge portion, in each case are directly connected together. Adjacent main and wiper edges which are associated with different cutting edge portions therefore directly adjoin one another. However, it is also possible for the ends of adjacent main and wiper edges which are associated with different cutting edge portions not to adjoin one another directly. The advantage of a cutting insert with a complete edge is that the entire length of the periphery of the cutting insert can be utilized efficiently. In a preferred manner, adjoining main and wiper edges which are associated with different cutting edge portions enclose an obtuse interior angle, in particular within the range of between 170° and less than 180°. As a result of said development, the inactive main edge, which adjoins an active wiper edge in the circumferential direction of the cutting insert, can be better protected from wear.

In an advantageous embodiment, the main edge and the wiper edge which adjoin the same cutting corner—in a top view onto the top surface of the cutting insert—enclose an inside angle of approximately between 85° and 95°, in a preferred manner said enclosed angle is between 90° and 92°. As a result, when the cutting insert is positioned on the support body of the milling tool in a corresponding axially and radially tilted assembly position, very precise shoulders with 90° corners can be milled in the workpiece to be machined, whilst at the same time the inactive main and wiper edges are reliably protected.

The circumferential lateral face of the cutting insert according to the invention comprises main clearance faces which in each case directly adjoin the main edges and wiper clearance faces which in each case directly adjoin the wiper edges, respectively. The exterior angles located between the main clearance faces and the reference plane differ from the exterior angles located between the wiper clearance faces and the reference plane, the former being larger than the latter.

Corresponding to a preferred embodiment, the wiper clearance faces move closer to the axis of symmetry as the distance from the associated wiper edge increases. In other words, the cutting insert, in this case, comprises a positive nominal wiper clearance angle. The wiper clearance faces can extend in this way, for example, up to a region in the vicinity of the reference plane, where they meet the corresponding wiper clearance face of the wiper edge which is situated on the opposite side of the cutting insert. In a preferred manner, the wiper clearance faces are realized as planar faces.

The exterior angle between the main clearance face and the reference plane is in each case greater than the exterior angle between the wiper clearance face and the reference plane.

In a preferred embodiment, the main clearance face realizes an obtuse exterior angle with respect to the reference plane, the main clearance faces are therefore moved away as the distance between the associated main edge and the axis of symmetry increases. The exterior angle formed between the respective main clearance face and the reference plane, in a preferred manner, is consequently greater than 90°. In other words, the cutting insert, in this case, comprises a negative nominal main clearance angle. In a preferred manner, the main clearance faces are also realized as planar faces.

In a preferred embodiment, where both the main clearance faces and the wiper clearance faces are realized as planar faces, the circumferential lateral face has a segmented structure where the main clearance faces and the wiper clearance faces intersect. On account of the larger exterior angle with respect to the reference plane compared to the wiper clearance surfaces, the main clearance faces typically extend over a smaller surface area. In this case, the main clearance faces can be realized, in particular, as facets on the wiper clearance faces.

In a top view onto the top surface of the cutting insert, in a preferred embodiment, the outer contour of the first cutting edge is not aligned with the outer contour of the second cutting edge. Preferably, in a top view along the axis of symmetry, the cutting corners of the first cutting edge are not in alignment with the cutting corners of the second cutting edge located behind. In such a top view onto the top surface of the cutting insert, the cutting corners of the second cutting edge can be arranged in relation to the cutting corners of the first cutting edge, in particular rotated by an angle of between greater than 0° and 5° with reference to a rotation about the axis of symmetry. The non-alignment between the outer contour of both cutting edges or the rotation of the cutting corners, in combination with the axially and radially tilted assembly position of the cutting insert, makes it possible for the inactive cutting edges, which are situated on the opposite side to the main and wiper edges which engage in the workpiece, to be protected from damage in an even better manner.

In a top view onto the assigned wiper clearance face, the respective wiper edge can be realized at least in regions in a convex manner. This clearly improves—compared to a development where the wiper edge extends, for example, in a straight manner—the quality of the surface smoothed with the wiper edge on the machined workpiece.

According to an embodiment, in each case the top surface and the bottom surface adjoining the respective cutting edge are provided with rake faces which move closer to the reference plane as the distance from the respective cutting edge increases. In a preferred manner, the top surface and the bottom surface can be provided in each case with a chip-conducting structure which brings about improved chip formation.

In a preferred manner, the length of the main edges is more than four times, in particular more than five times the length of the wiper edges.

In an advantageous manner, the cutting insert comprises, concentrically to the axis of symmetry, a through-opening which extends between the top surface and the bottom surface of the cutting insert and serves for receiving a fastening means, such as, for example, a screw, by way of which the cutting insert is fastened in a known manner on the carrier body of the milling tool, in a preferred manner in a radial alignment.

A radial alignment is to be understood as an arrangement where the top surface or bottom surface of the cutting insert is oriented forward in the circumferential direction of the rotating milling tool. In contrast to this, in the case of a tangential alignment, the narrow side (lateral face) of the cutting insert is directed forward in the circumferential direction of the rotating milling tool. In the case of a radial alignment, consequently, the cutting forces occurring during machining are predominantly perpendicular to the reference plane of the cutting tool and not parallel to the reference plane, as would be the case with a tangential arrangement. A radially arranged cutting insert is also designated as a radial cutting insert.

A milling tool with a carrier body and at least one previously described cutting insert is also part of the invention, the cutting insert being fastened in a radial arrangement on the support body of the milling tool. The cutting insert is arranged in such a manner on the milling tool that the active wiper edge which moves into engagement with the workpiece is aligned substantially perpendicular to a rotational axis of the milling tool, such a substantially perpendicular alignment also including a slight tilting in the direction of the rotational axis by up to 1°. The main edge, which adjoins the wiper edge and is situated radially outside with reference to the rotational axis and is arranged on the front cutting edge in the direction of rotation, forms the active main edge which engages in the workpiece to be machined.

BRIEF DESCRIPTION OF THE SEVERAL VIEWS OF THE DRAWING

The invention is explained in more detail below by way of figures, in which.

DESCRIPTION OF THE INVENTION

Figure 7:
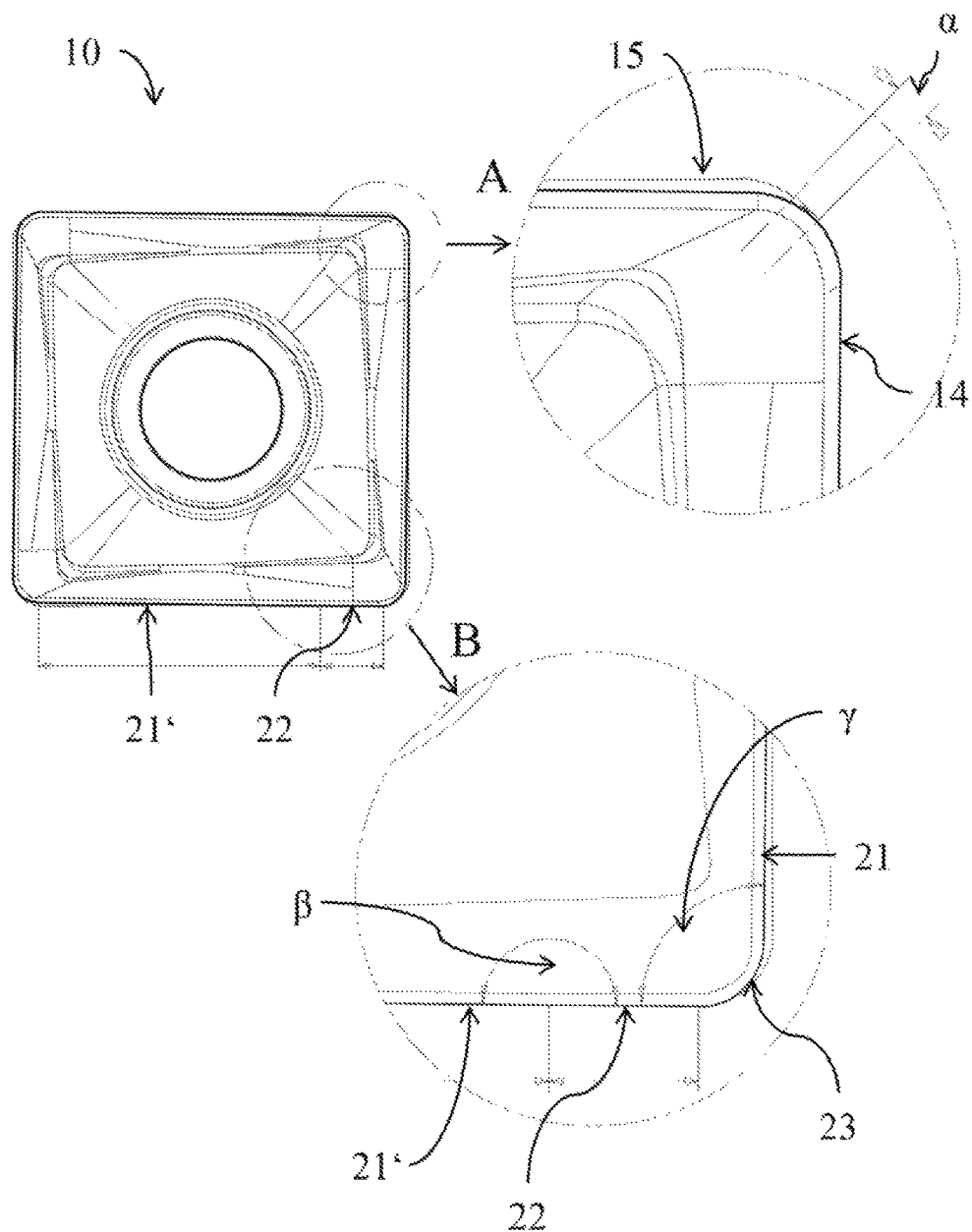
FIG. 7: shows an enlarged representation of individual details in a top view onto the cutting insert of FIG. 3.

The double-sided cutting insert (10) is realized as an indexable insert of the so-called S-type (square, square-shaped) and comprises a top surface (11), a bottom surface (12) and a circumferential lateral face (13) which forms the lateral surface of the basic body. In a top view onto the top surface, the basic body of the cutting insert has a substantially square-shaped basic form. A first cutting edge (14) is realized at the transition or the intersection between the top surface (11) and the lateral face (13) and a second cutting edge (15) is realized at the transition between the bottom surface (12) and the lateral face (13). The cutting insert (10) comprises a 4-fold rotational symmetry with reference to the axis of symmetry (Z) which extends perpendicular to an (imaginary) reference plane (XY) which divides the cutting insert (10) into a top half and a bottom half which are identical to one another. As can be seen in FIG. 7 (detail A), the outer contour of the cutting corners of the first cutting edge (14), with reference to the axis of symmetry (Z), are rotated in such a manner about a first angle ($\sigma$) in relation to the outer contour of the cutting corners of the second cutting edge (15) that in a top view onto the top surface (10), the center of a cutting corner of the first cutting edge (14) is in each case not in alignment with the center of the cutting corner of the second cutting edge (15) located behind. In the case of the exemplary embodiment shown, the angle ($\sigma$) is approximately 2°. A bore (16), which penetrates the cutting insert from the top surface (11) to the bottom surface (12) and is provided for receiving a fastening screw for fastening the cutting insert (10) on a support body of a milling tool, extends concentrically with respect to the axis of symmetry (Z). A contact surface (17), which extends parallel to the reference plane (XY) and serves as a contact surface when the cutting insert (10) is fastened on the support body of the milling tool, is provided both on the top surface (11) and on the bottom surface (12) adjoining the bore (16).

The first cutting edge (14) and the second cutting edge (15) in each case comprise four identically realized cutting edge portions (20, 20', 20", 20''') which are usable independently of one another. In this case, the cutting edge portions each comprise a main edge (21, 21', 21", 21''') and a wiper edge (22, 22', 22", 22''') which are connected together or merge into one another by means of an assigned cutting corner (23, 23', 23", 23'''). On account of the four-fold rotational symmetry of the cutting insert, the following description is primarily limited to one cutting edge and one cutting edge portion. When the respective cutting edge portion is operating, the main edge (21), the wiper edge (22) and the assigned cutting corner (23) of a cutting edge portion (20) are utilized at the same time for machining the material. The main edges and wiper edges are arranged in an alternating manner along the respective cutting edge (14) or (15), are interrupted at the corners by cutting corners (23) and directly adjoin one another or merge into one another. The two cutting edges (14, 15) are therefore realized as complete edges. The main edges are longer than the wiper edges and their length is between four and five times the length of wiper edges. When viewed in a top view along the axis of symmetry (Z), the main edges (21') and wiper edges (22), which are adjacent along the lateral line and in each case are associated with different cutting edge portions, enclose an obtuse interior angle ($\rho$), e.g. between approximately 178° and less than 180°, as can be seen in FIG. 7. In a top view along the axis of symmetry (Z), the main edge (21) and the wiper edge (22) which abuts against the same cutting corner (23) enclose in each case an inner angle ($\gamma$) of between approximately 90° and 92°, in a preferred manner of greater than 90°.

Figure 2:
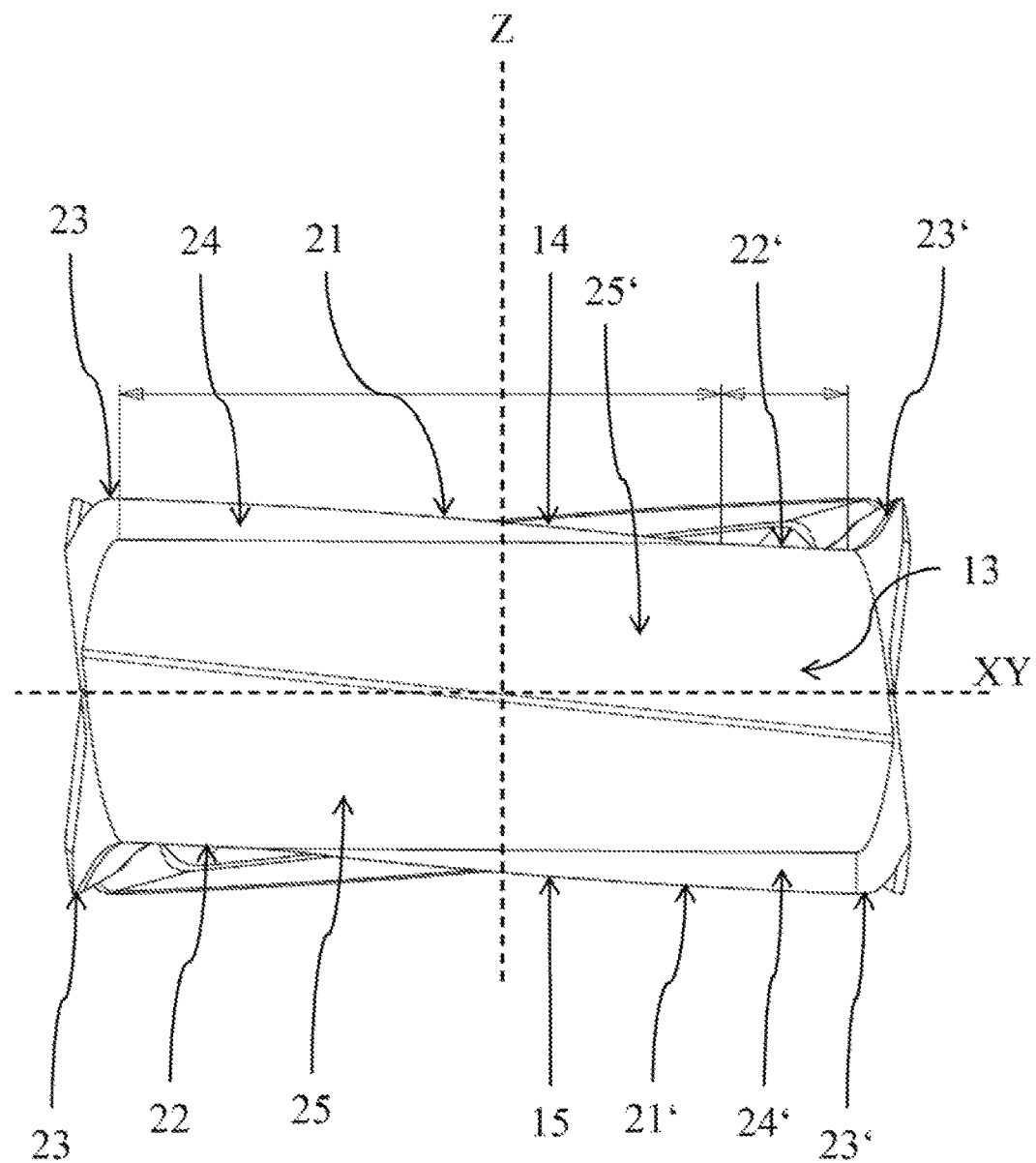
FIG. 2: shows a side view of the cutting insert of FIG. 1 in a direction perpendicular to an axis of symmetry and substantially perpendicular to a lateral face.

As can be seen, for example, in FIG. 2, the first and second cutting edges (14, 15) are at the greatest distance from the imaginary reference plane (XY) in each case in the region of the cutting corners. Proceeding from the cutting corner (23), the main edge (21), which is associated with a cutting corner (23), and the wiper edge (22'), which connects to the same as an extension thereof and is associated with another cutting edge portion, move closer to the reference plane (XY) in a monotonously declining manner as the distance from the cutting corner increases. The region of the main edge (21) which connects to the cutting corner (23) is consequently at a greater distance from the reference plane (XY) than the region of the wiper edge (22) which connects to the other side of the cutting corner (23).

The main edge (21) has associated therewith in each case a planar main clearance face (24) which is realized directly adjoining the main edge in the circumferential lateral face (13). The wiper edge (22) has associated therewith in each case a planar wiper clearance face (25) which is realized directly adjoining the wiper edge in the circumferential lateral face (13). As can be seen in particular in FIG. 1 and FIG. 2, the main clearance face (24) is realized as a facet of the plane of the wiper clearance face (25') of the adjacent wiper edge (22') of an adjoining cutting edge portion (20').

Figure 5:
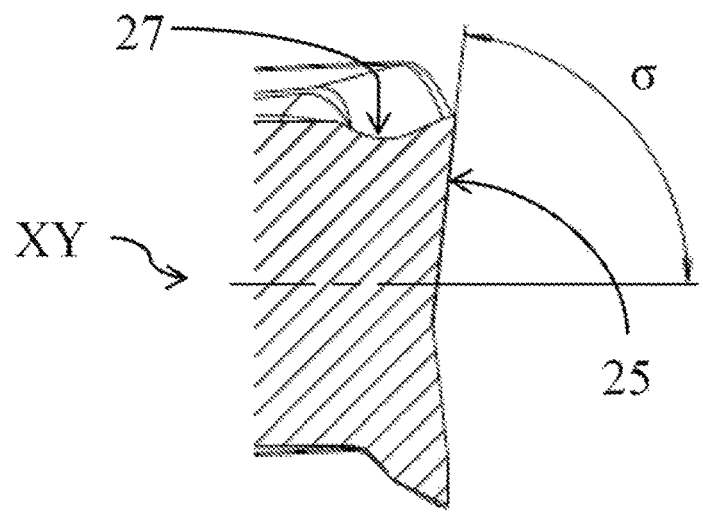
FIG. 5: shows a partial sectional representation of a section in the direction B-B in FIG. 3.
Figure 6:
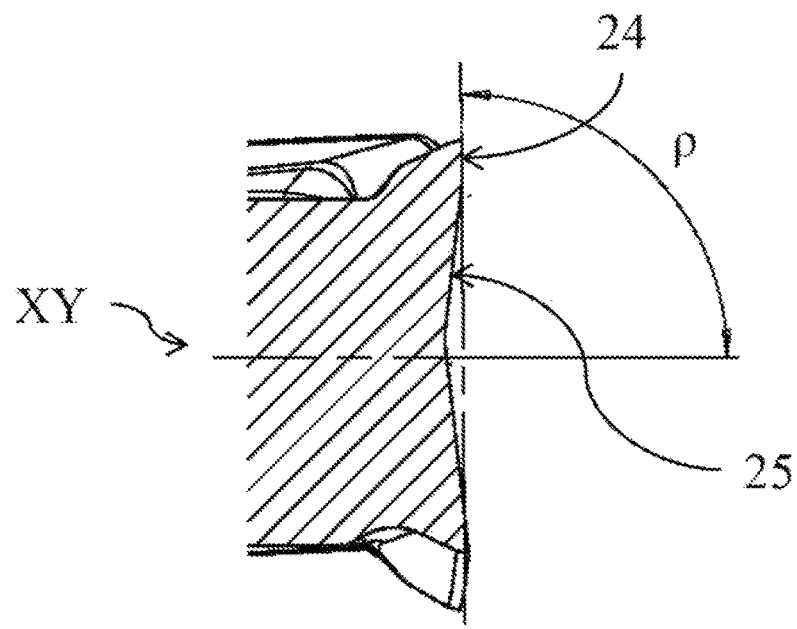
FIG. 6: shows a partial sectional representation of a section in the direction C-C in FIG. 3.

The development of the clearance faces in the region of the main edges and in the region of the wiper edges can be seen in FIG. 5 and FIG. 6, where in each case a section through the cutting insert in the region of the main edge (FIG. 6) or in the region of the wiper edge (FIG. 5) is shown, the position of the section being chosen such that both sectional regions are at approximately the same distance from oppositely situated, adjacent cutting corners.

The wiper clearance faces (25) extend in such a manner that they move closer to the axis of symmetry (Z) as the distance from the assigned wiper edge (22) increases, i.e. measured with respect to the reference plane in a sectional plane perpendicular to the reference plane (XY) and substantially perpendicular to the cutting edge, they realize an acute exterior angle ($\sigma$) with the reference plane, in the exemplary embodiment an exterior angle ($\sigma$) of approximately 83°. Consequently, the wiper clearance face (25) in the exemplary embodiment extends at a nominal wiper clearance angle (90°−$\sigma$) of approximately 7°.

The main clearance faces (24) extend in such a manner that they move away from the axis of symmetry (Z) as the distance from the assigned main edge (21) increases, i.e. they extend in each case at an obtuse exterior angle ($\rho$) measured with respect to the reference plane (XY). In the exemplary embodiment, the exterior angle ($\rho$) is approximately 91°. Consequently, the main clearance face (24) in the exemplary embodiment comprises a nominal main clearance angle (90°−$\rho$) of approximately −1°, consequently a negative nominal main clearance angle.

When measured with respect to the reference plane of the cutting insert, the exterior angles ($\rho$) in the region of the main edges are therefore greater than the exterior angles ($\sigma$) in the region of the wiper edges. In other words, the nominal main clearance angles are smaller than the nominal wiper clearance angles.

As the main clearance face and the wiper clearance face are inclined differently with respect to the reference plane and both are realized as planar faces, the circumferential lateral face has a segmented structure where the main clearance face tapers to the end of the main edge and extends over a region with a smaller surface area. The wiper clearance face extends up to a region in the vicinity of the reference plane (XY), where it meets the wiper clearance face which is assigned to the wiper edge situated on the opposite side of the cutting insert.

Figure 1:
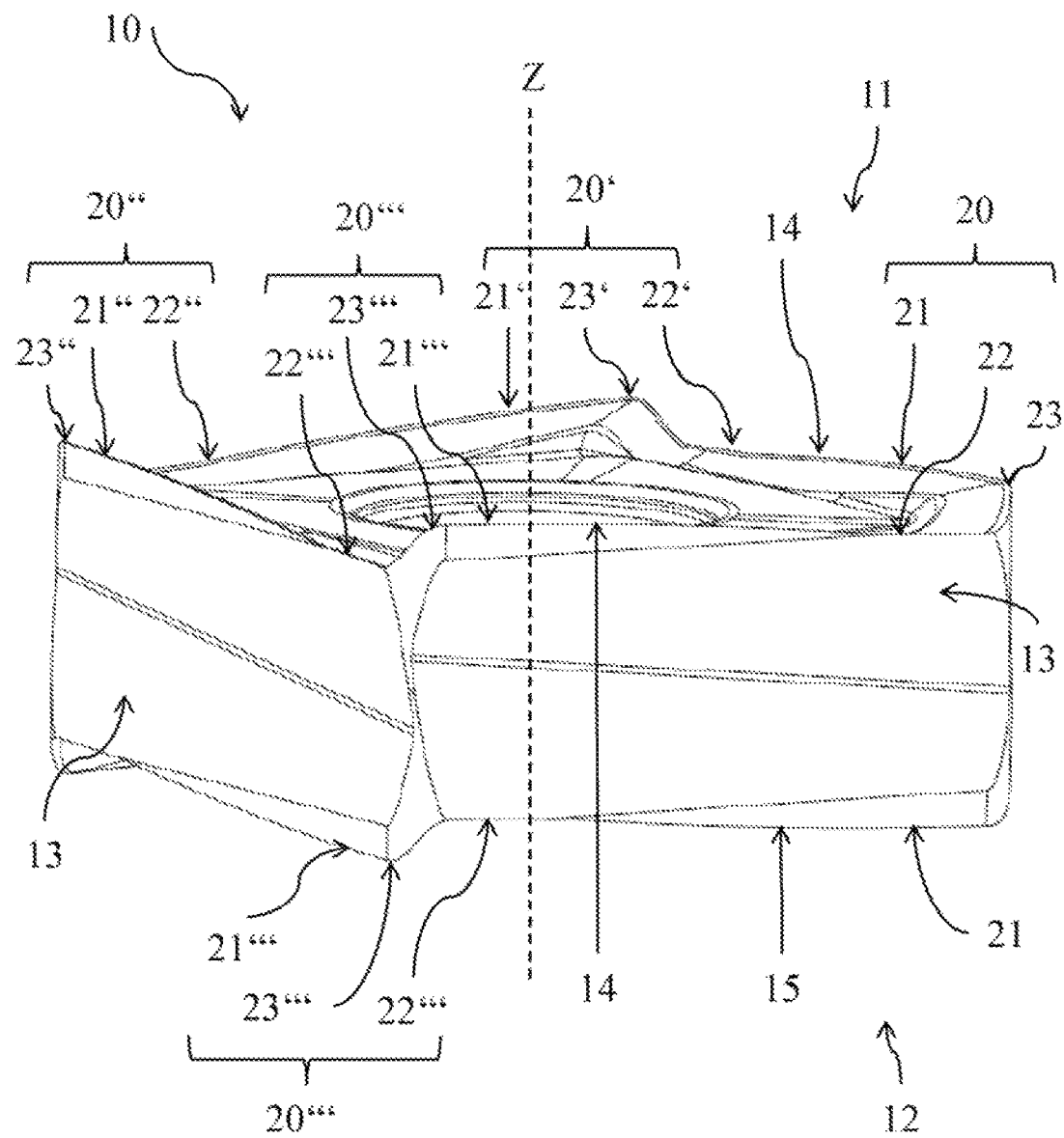
FIG. 1: shows a perspective view of a double-sided cutting insert according to one embodiment.
Figure 3:
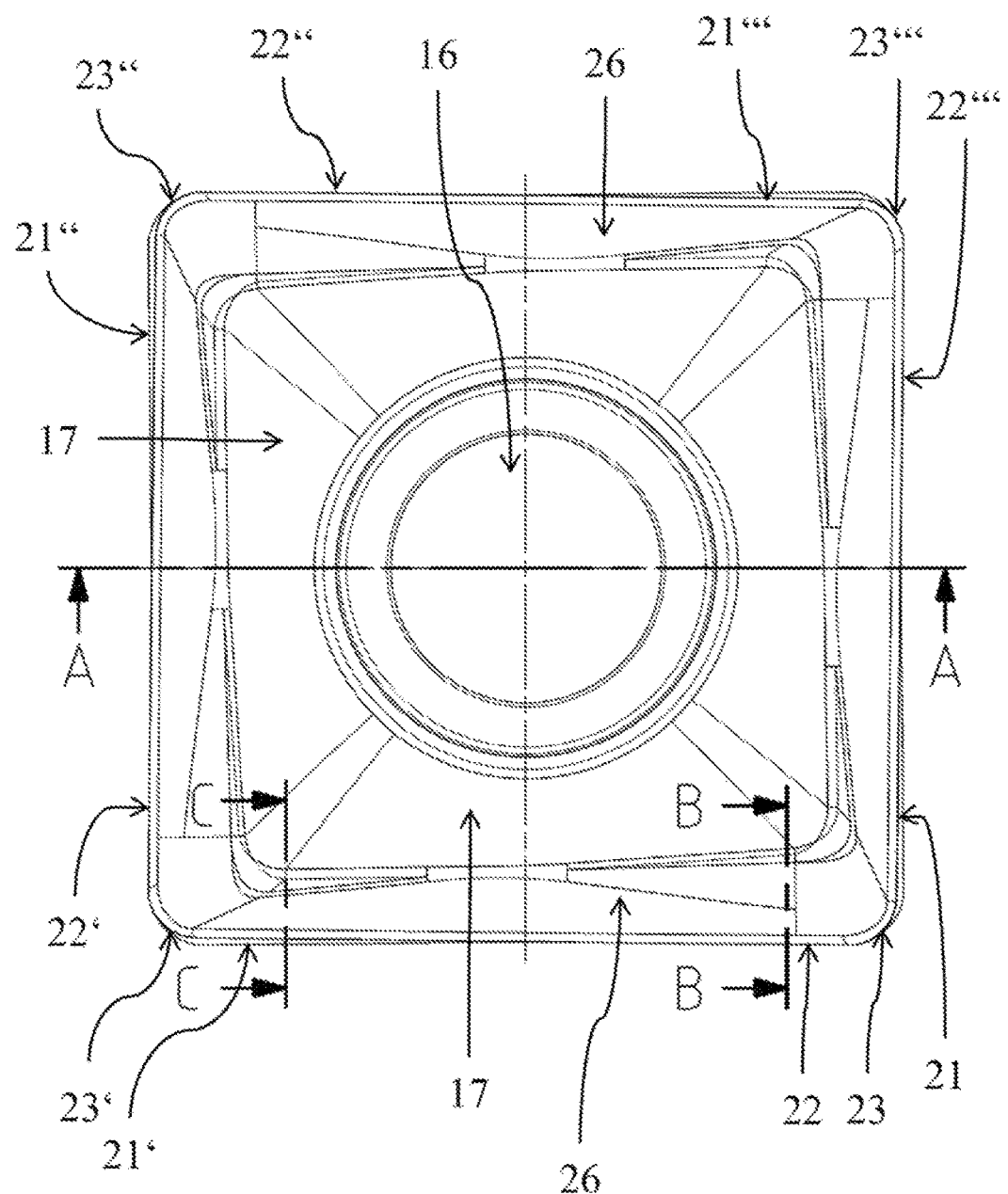
FIG. 3: shows a top view onto the cutting insert of FIG. 1 along the axis of symmetry.
Figure 4:
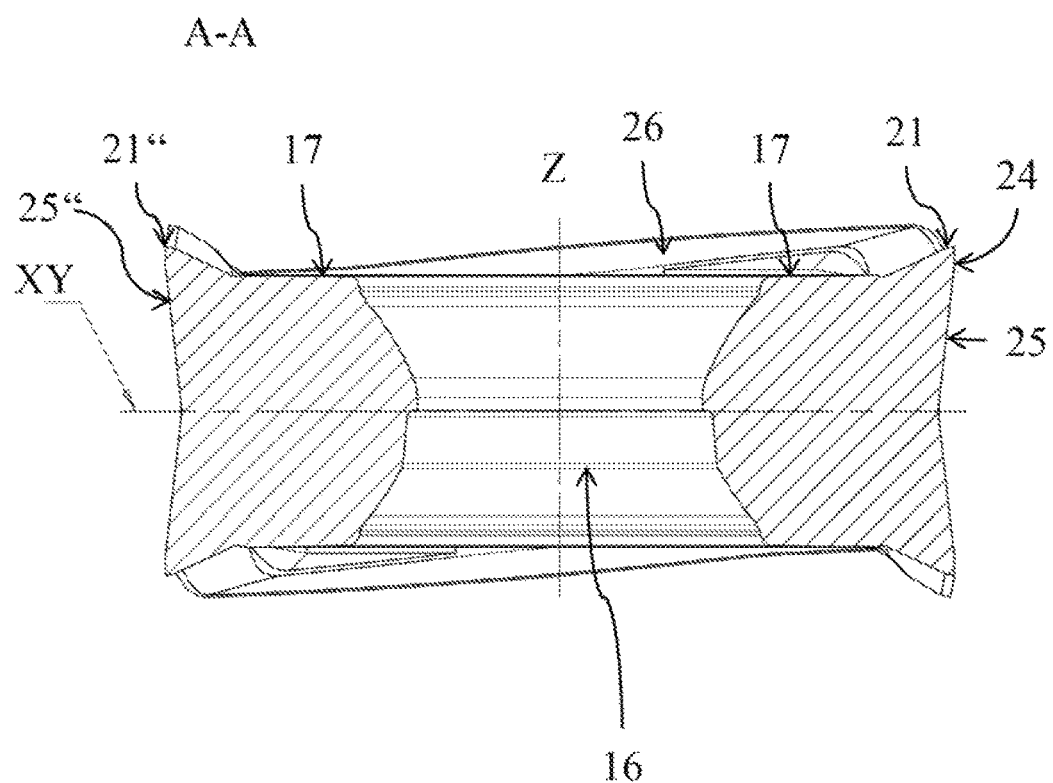
FIG. 4: shows a section in the direction A-A in FIG. 3.

As can be seen from FIG. 1 or FIG. 3, the top surface or bottom surface, adjoining the respective cutting edge, comprises rake faces (26) which, as the distance from the respective cutting edge increases, move closer to the contact face (17), which extends parallel to the reference plane and serves as a support face for the fastening of the cutting insert, and merge into said contact face. The contact face (17) does not have to be realized as a planar face. In a preferred manner, the top surface and the bottom surface can be provided in each case with chip-conducting structures in order to improve chip formation. An arched indentation, which forms the minimum distance between the top surface and the reference plane (XY) and which, whilst realizing a rising ridge in the direction of the axis of symmetry (Z), merges into the contact face (17), is provided in the development of the rake faces (26), above all in the region of the wiper edges. The depth (measured in a direction along the axis of symmetry) and width (measured in a direction parallel to the reference plane) of said rake floor is greatest in the region of the center of the wiper edges.

Figure 8:
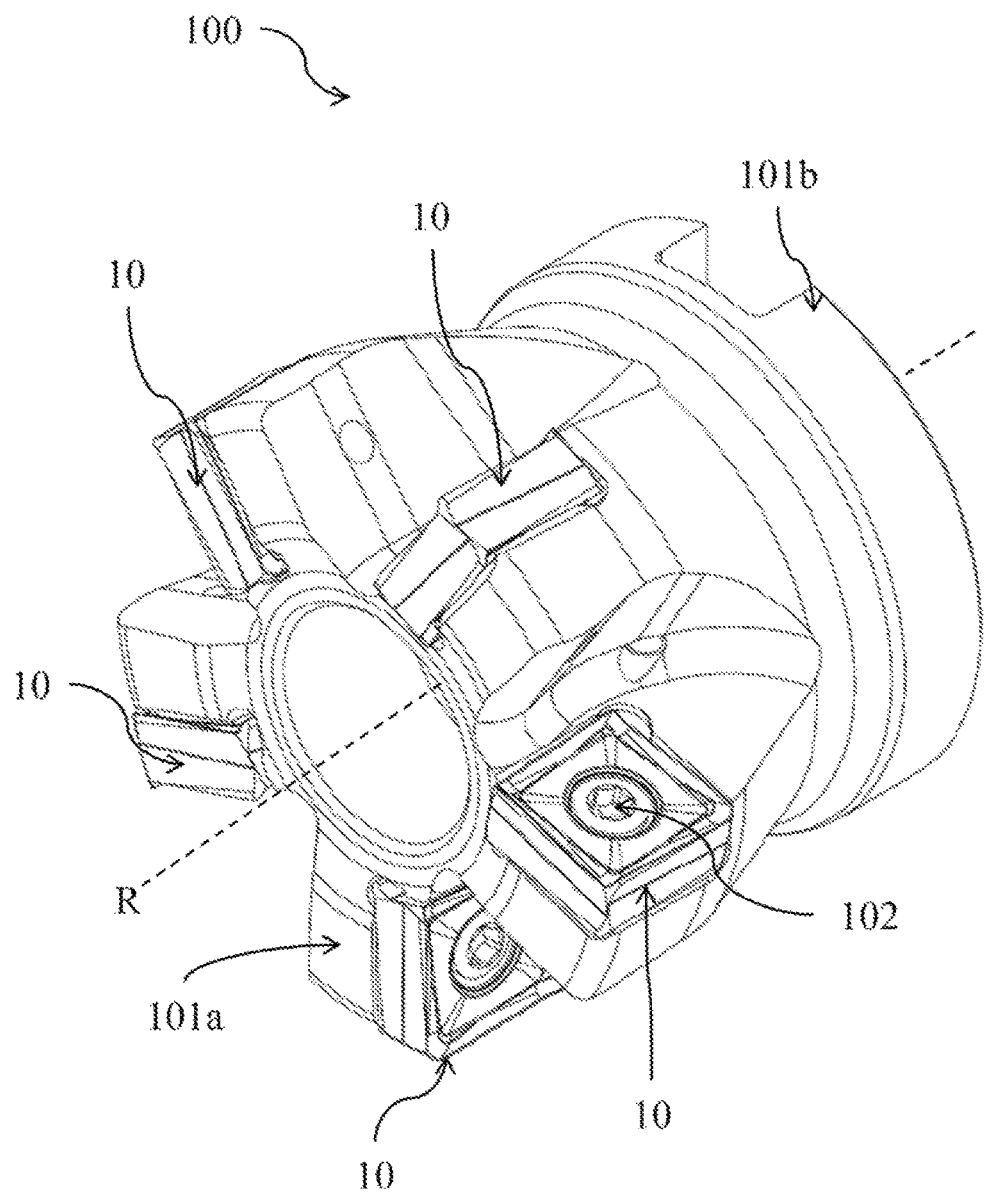
FIG. 8: shows a perspective view of the support body of the milling tool with cutting inserts fastened thereon.
Figure 9:
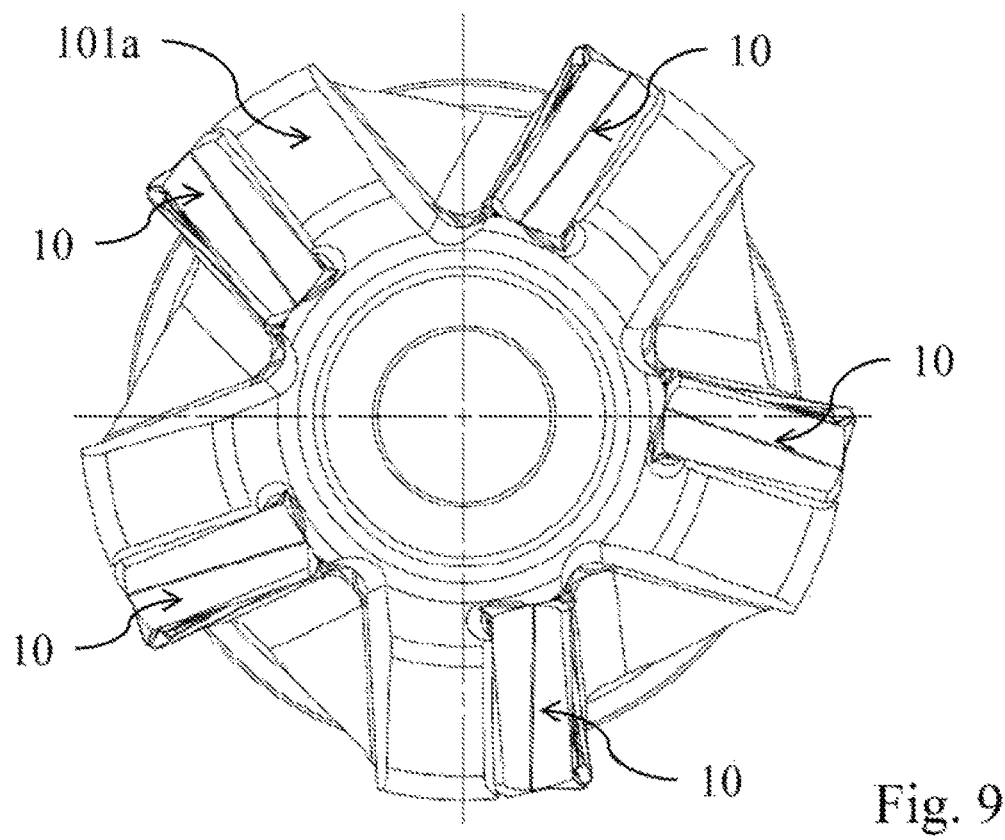
FIG. 9: shows a top view onto the end face of the milling tool of FIG. 8.
Figure 10:
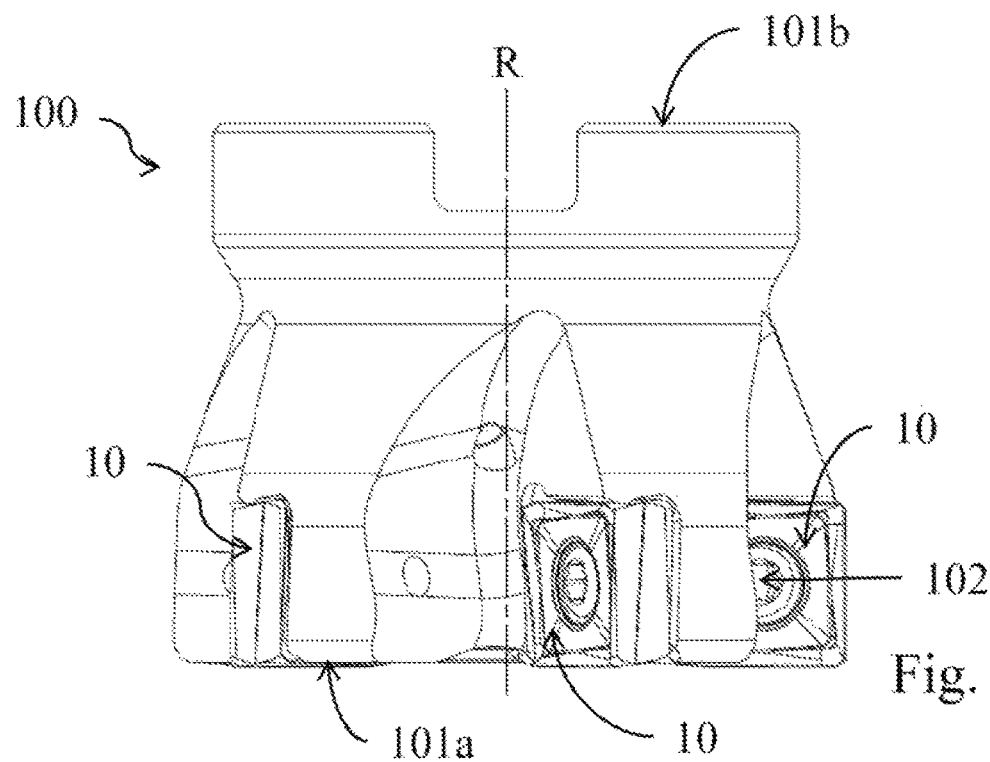
FIG. 10: shows a side view of the milling tool of FIG. 8.

FIG. 8 to FIG. 10 show a milling tool with a support body (100) and a plurality of cutting inserts (10) fastened thereon. The figures show a support body with five cutting inserts, however realizations of the support body with fewer (at least one, in a preferred manner two) or more cutting inserts are of course also possible. The support body (100) comprises a rotational axis (R) about which the support body rotates when operating. In the region of the end face (101*a*) of the support body, a plurality of cutting inserts (10) are mounted in a radial alignment by means of screw connections (102). The support body is correspondingly adapted at its second end (101*b*) in order to be coupled to a processing machine, in particular a milling machine. The active wiper edges, which engage in the workpiece during operation, are aligned substantially perpendicular to the rotational axis (R) of the support body and are arranged on the front cutting edge in the direction of rotation. The main edge, which adjoins the wiper edge, is situated radially outside with reference to the rotational axis and is arranged on the front cutting edge in the direction of rotation, forms the active main edge which engages in the workpiece to be machined. The cutting inserts (10) are in each case tilted both in the radial direction and the axial direction in order to protect the inactive cutting edges from damage.

By means of the milling tool according to the invention, the workpiece material can be removed in a shoulder-shaped manner, in particular shoulders with 90°-corners can be milled. As a result of the corresponding development of the cutting inserts, corrugation on the surface of the machined workpiece is minimized and, as a result, the quality obtained on the machined surface of the workpiece is high.

The invention claimed is:

1. A double-sided cutting insert for milling, said cutting insert comprising:
    a cutting insert body having a 4-fold rotational symmetry with regard to an axis of symmetry;
    a reference plane extending perpendicular to said axis of symmetry and dividing said cutting insert body into two halves;
    a top surface, a bottom surface, and a circumferential lateral face;
    a first cutting edge formed at a transition from said top surface to said circumferential lateral face;
    a second cutting edge formed at a transition from said bottom surface to said circumferential lateral face;
    each of said first cutting edge and said second cutting edge having four cutting edge portions,
        wherein each said cutting edge portion has a main edge and a wiper edge, interconnected by way of an associated rounded cutting corner;
    each of said first and second cutting edges having a greatest distance from said reference plane at a region of said cutting corners,
        wherein a main clearance face is formed in each case directly adjoining an assigned main edge in said circumferential lateral face;
    a wiper clearance face formed in each case directly adjoining an assigned wiper edge in said circumferential lateral face; and
    wherein exterior angles formed between said main clearance faces and said reference plane are greater than exterior angles formed between said wiper clearance faces and said reference plane.

2. The cutting insert according to claim 1, characterized in that the cutting insert has a substantially square-shaped basic form in a top view onto the top surface.

3. The cutting insert according to claim 1, wherein, viewed in a top view onto said top surface, an outer contour of said first cutting edge is not aligned with an outer contour of said second cutting edge.

4. The cutting insert according to claim 1, wherein, viewed in a top view onto said top surface, said cutting corners of said first cutting edge are not in alignment with said cutting corners of said second cutting edge.

5. The cutting insert according to claim 1, wherein each said main clearance face is a planar face.

6. The cutting insert according to claim 1, wherein said main cutting edge and said adjacent wiper edge, which is connected by way of a common said cutting corner, enclose an angle of greater than 90° when viewed in a top view onto said top surface.

7. The cutting insert according to claim 1, wherein a length of said main edges is more than four times a length of said wiper edges.

8. The cutting insert according to claim 1, wherein said exterior angles formed between said main clearance faces and said reference plane are 90° or more.

9. The cutting insert according to claim 1, wherein said exterior angles formed between said wiper clearance faces and said reference plane are less than 90°.

10. The cutting insert according to claim 1, wherein said cutting insert body is formed as a radial cutting insert.

11. The cutting insert according to claim 1, configured for corner milling.

12. A milling tool, comprising:
    a milling tool support body; and
    at least one cutting insert according to claim 1 fastened in radial arrangement on said milling tool support body.

13. The milling tool according to claim 12, wherein an active main edge of said cutting insert is aligned substantially along a cylindrical surface that is concentric about a rotational axis of said milling tool support body.

* * * * *